Nov. 11, 1952
F. K. DAGGETT
2,617,164
CIRCULAR CLAMP
Filed June 4, 1948
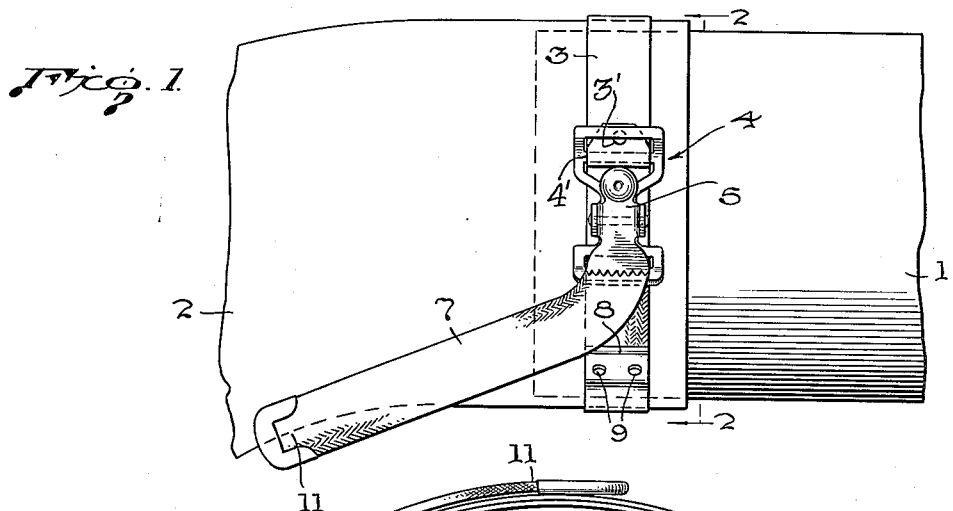
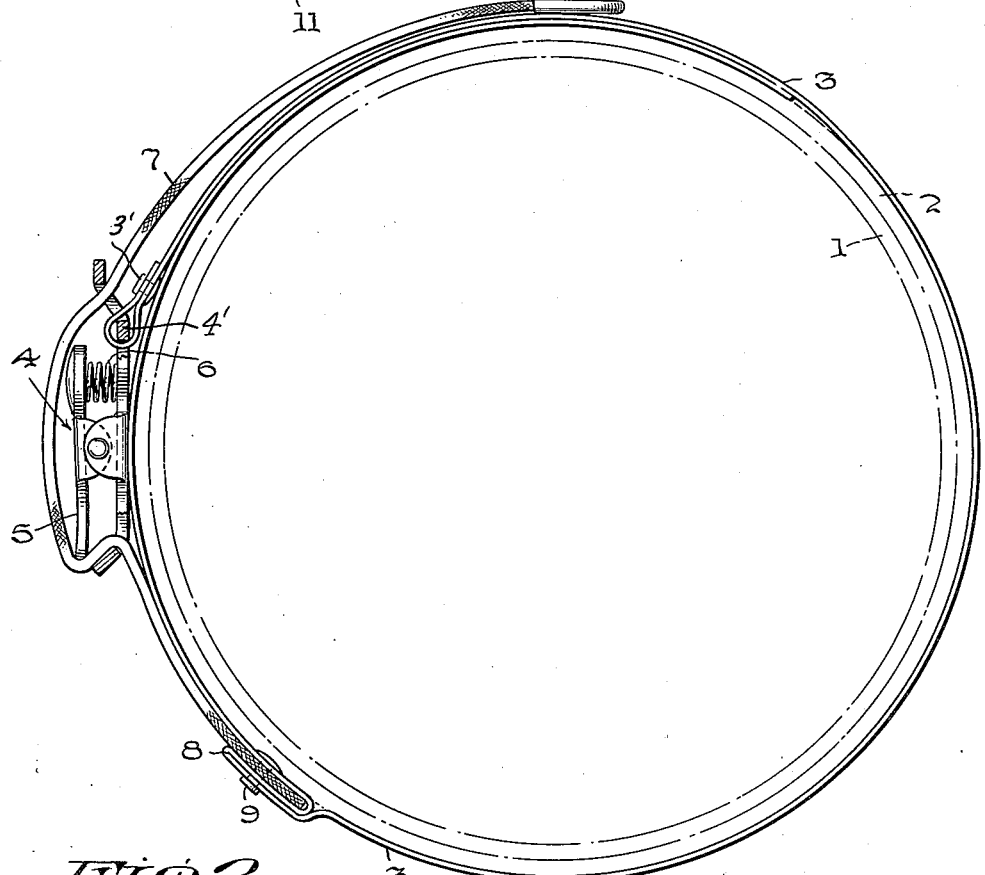
INVENTOR.
FREDERICK K. DAGGETT
BY
Pennie, Edmonds, Morton + Barrows
ATTORNEYS Patented Nov. 11, 1952

2,617,164

UNITED STATES PATENT OFFICE 2,617,164

CIRCULAR CLAMP

Frederick K. Daggett, Branford, Conn., assignor to The Flexible Tubing Corporation, Branford, Conn., a corporation of Connecticut Application June 4, 1948, Serial No. 31,097

1 Claim. (Cl. 24—20)

This invention relates to clamping devices for articles substantially circular in section, and having diameters varying over a considerable range, and more particularly to such a clamping device which will possess all of the advantages of a continuous metal clamping band, as well as the advantages of a fabric or leather strap securing means.

While the clamp of the present invention is adapted to various applications, it is particularly useful for clamping a flexible conduit or hose to a fluid-conducting pipe section over which the conduit has been telescoped.

Heretofore it has been proposed to provide a clamp for securing a flexible conduit to a pipe section, comprising a metal band, a metal strip welded or riveted to an intermediate portion of the band adjacent one end thereof so that the conduit is completely encircled, and means for securing the ends of the band together by a tightening bolt and nut of the general type used on clamps for water hose. While such a clamp has the advantages of a continuous encircling clamping band, it requires the use of the usual type of fasteners for securing metal bands together and does not possess the advantages of ready and easy attachment and adjustment which are provided by the usual fasteners for fabric or leather straps.

The present invention contemplates a clamp formed of an encircling strip or band of a firm, somewhat flexible material such as sheet metal and a flexible non-metallic strap suitably attached thereto for fastening the metal band in place about the article to be clamped. The arrangement is such that the clamp provides the benefits of a metal clamp which completely encircles the flexible conduit, and because of its rigidity performs a smooth, firm clamping action on every portion of the conduit lying beneath it, as well as the benefits of a flexible strap fastening means which permits the broadest range of adjustment as well as an easily and readily operable means of attachment and adjustment.

More specifically the present invention contemplates a clamp formed from a single band of sheet steel or other metal to one end of which is secured a strap clasp of any suitable type. A flexible strap of fabric, leather, or the like is secured to the metal band intermediate its ends in any convenient manner, but preferably by folding the metal band upon itself to form an outwardly extending fold, bending the fold over one end of the strap to clamp it against an adjacent part of the metal band, and then riveting the parts together to prevent removal of the strap. The free end of the strap may be pulled through the clasp to tighten the metal band and to cause it to firmly clamp a flexible conduit about a pipe section. The length of the portion of the metal band beyond the place where the strap is secured thereto is such that the free end portion thereof underlies the end portion to which the clasp is secured for a substantial distance, thereby ensuring that the band will completely encircle the conduit or the like to be clamped, and also enabling the clamping device to be used for the clamping of flexible conduits varying substantially in diameter.

The present clamp not only possesses all the desirable attributes of both a metal clamp and a strap fastener, but is inexpensive to manufacture and may readily be applied in tight clamping position about flexible conduits varying through a wide range of diameters.

The invention will be further described in connection with the accompanying drawings which show a preferred embodiment thereof. However it is to be understood that such further and detailed description is merely by way of exemplification and the invention is not limited thereby except to the extent set forth in the appended claims.

In the drawings:

Fig. 1 is a plan view of the clamping device of the present invention shown as securing a section of a flexible conduit to a pipe section, and Fig. 2 is an enlarged side elevational view, partly in section, of the clamping device with the flexible conduit and pipe section shown in dot and dash lines.

Referring to the drawings, 1 designates a section of a fluid conduction pipe which has a flexible conduit or hose 2 telescoped over its end portion and secured thereto by the clamping device of the present invention.

The conduit clamping portion 3 of the clamp consists of a narrow band or strip of any suitable sheet metal which is sufficiently stiff and hard to satisfactorily press every portion of the conduit underlying the clamp against the pipe section and thus cause the joint between the hose and pipe section to be fluid-tight.

A strap-securing clasp 4 is secured to one end of the metal band by looping the end of the band through one end of the clasp around a cross bar 4' of the clasp and securing the loop by welding, riveting, or the like, for example, by a rivet 3' as shown in the drawings. The clasp shown is of the spring type having a lever 5 pivotally mounted centrally of its body. One end of the lever is serrated to engage and hold a strap in adjusted position, while the other end thereof is adapted to be engaged by one's finger for depressing to release a clasped strap. The lever 5 normally is biased into its strap-engaging position by a spring 6.

The metal band 3, comprising the clamping portion of the clamp, is of such length that it extends completely around the hose and its free end extends forwardly beyond the clasp-securing end and beneath it so that, when tightly clamped, every portion of flexible conduit will be subject to the clamping action of the band. Thus, the greater the length of the metal strip the larger the diameter of the hose to which the clamp may be applied.

A flexible strap 7 of fabric, leather, or the like, is attached to the metal band intermediate of its length and extends forwardly toward the strap clasp, overlying the free end portion of the metal band 3. The attachment of the strap 7 to the metal band 3 may be accomplished in any desired manner, but preferably by pinching a portion of the band together to form a fold 8 which is then bent forwardly over the adjacent portion of the band and over an end of the strap 7, which thereby is clamped between the fold and the adjacent portion of the band over which the fold is bent. The strap end then is securely held in its clamped position by rivets 9 which are passed through the fold 8, the end of the strap 7 and the adjacent forwardly-extending portion of the metal band. The free end 11 of the strap is adapted to be received by the clasp 4 and to be adjustably secured therein by the serrated end of lever 5.

In applying the clamp for securing the section of flexible conduit or hose to the fluid-conducting pipe section, the clamp first may be slipped over the end of the conduit, or have its ends separated and placed around the conduit, with the free end portion thereof underlying the end portion to which the clasp 4 is attached, after which the end portion of the conduit is telescoped over the end of the pipe section. The clamp is then placed in the desired position overlying the conduit at a point where the conduit overlies the pipe section. The free end of the strap is then drawn through the clasp 4 until the band 3 firmly and smoothly clamps the flexible conduit about the pipe section. The free end of the strap may then be released. The serrated end of the lever 5 will securely maintain the strap in its adjusted holding position. As the free end of the band 3 underlies the strap and the end of the band to which the clasp is attached, a continuous smooth clamping action is obtained around the entire periphery of the flexible conduit.

To disconnect the flexible conduit from the pipe sections, it is only necessary to depress the free end of the lever 5 to release the serrated end from its gripping engagement with the strap, whereupon the clamping action of the band 3 is relieved and the conduit may be slipped from the pipe section.

From the foregoing, it is clear that the range of diameters of articles for which the clamp may be satisfactorily used is determined only by the length of the fabric strap and the length of the portion of the metal band extending forwardly from the point of connection of the strap to the metal band. Also, it is clear that the clamp disclosed is simple in structure and is adapted for easy and ready application and removal and therefore possesses great flexibility of use.

While the clamp of the present invention has been described as particularly adapted to secure a section of flexible conduit or hose to a fluid-conducting pipe section, it is to be understood that this is but one use therefor and it may as readily be used to clamp other objects. Also, it is to be understood that various changes may be made in the details of the clamp without departing from the invention or sacrificing the advantages thereof.

I claim:

An adjustable clamp which comprises a metal band, a strap clasp attached to one end of the band, and a flexible non-metallic strap having one end attached to the metal band intermediate of the length of the band and having its other end adapted to be received by the strap clasp and adjustably secured thereby, the free end of the band extending beyond the place of attachment of the strap to the band a distance sufficient, when the clamp is in clamping position, to underlie the end of the band to which the clasp is attached, whereby the band will completely encircle an article to be clamped, said band having a folded portion, at the place of attachment of the strap to the band, which is bent forwardly towards the free end of the band over the end of the strap attached to the band, said end of the strap being secured between said folded portion and the underlying portion of the band.

FREDERICK K. DAGGETT.

REFERENCES CITED

The following references are of record in the file of this patent:

UNITED STATES PATENTS

| Number | Name | Date |
| --- | --- | --- |
| 74,367 | Hurd | Feb. 11, 1868 |
| 158,554 | Whitcomb | Jan. 5, 1875 |
| 277,431 | Smith | May 8, 1883 |
| 470,031 | Altman | Mar. 1, 1892 |
| 635,331 | Malins | Oct. 24, 1899 |
| 649,916 | Dietrich | May 22, 1900 |
| 807,496 | Rankin | Dec. 19, 1905 |
| 901,246 | Lyon | Oct. 13, 1908 |
| 1,010,763 | Hogan | Dec. 5, 1911 |
| 1,295,001 | Brown | Feb. 18, 1919 |
| 1,876,383 | Anderson | Sept. 6, 1932 |
| 1,996,276 | Cowen | Apr. 2, 1935 |
| 1,996,741 | Benge | Apr. 9, 1935 |
| 2,305,994 | Richards | Dec. 22, 1942 |
| 2,377,479 | Britcliffe | June 5, 1945 |
| 2,389,741 | Reichart | Nov. 27, 1945 |

FOREIGN PATENTS

| Number | Country | Date |
| --- | --- | --- |
| 685,970 | France | Apr. 7, 1930 |